E. H. AHARA.
DRIVING CLUTCH AND GUARD.
APPLICATION FILED SEPT. 29, 1913.
1,130,237.
Patented Mar. 2, 1915.
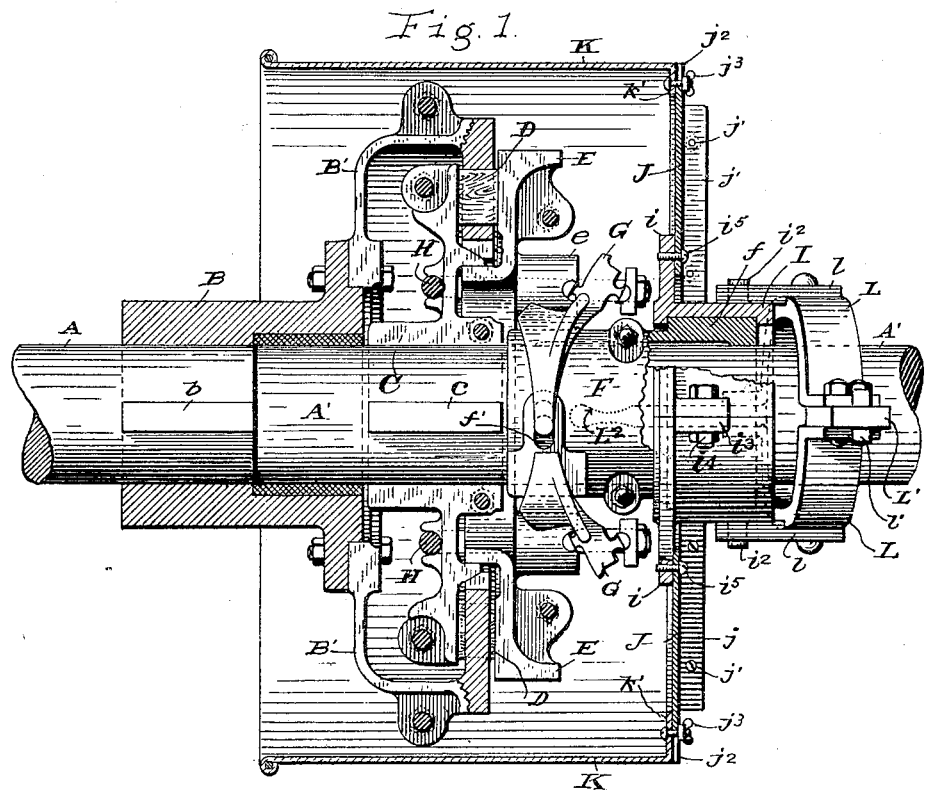
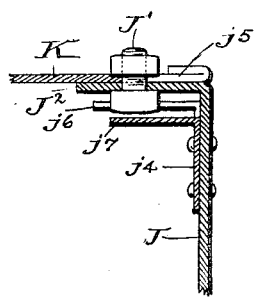
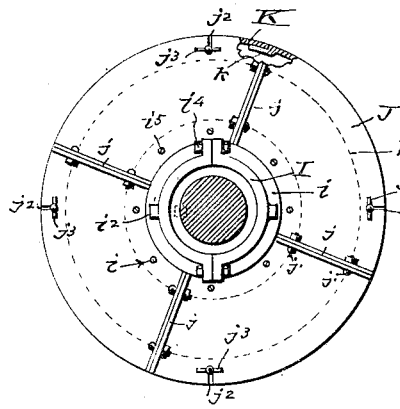
Witnesses
a. L. Anstutz.
H. P. Roberts.
Edwin Hugh Ahara, Inventor
By N. S. Anstutz,
Atty.

UNITED STATES PATENT OFFICE.

EDWIN HUGH AHARA, OF MISHAWAKA, INDIANA, ASSIGNOR TO DODGE MANUFACTURING COMPANY, OF MISHAWAKA, INDIANA, A CORPORATION OF INDIANA.

DRIVING-CLUTCH AND GUARD.

1,130,237. Specification of Letters Patent. Patented Mar. 2, 1915.

Application filed September 29, 1913. Serial No. 792,431.

*To all whom it may concern:*

Be it known that I, EDWIN HUGH AHARA, citizen of the United States, residing at Mishawaka, in the county of St. Joseph and State of Indiana, have invented certain new and useful Improvements in Driving-Clutches and Guards, of which the following is a specification.

My invention comprises improvements in safety devices, being related to guards for clutches, etc.

The special features of my device consist in providing a smooth casing surrounding projecting bolts, nuts, etc., so as to make it impossible for any one to become entangled in the projections and thus subject themselves to bodily injury.

In recent years the introduction of power transmitting clutches into manufacturing establishments has been extensive, securing thereby a greater flexibility in operation, etc., but without securing a complete over-all efficiency due to an uncovered risk always present where moving machinery is placed in close proximity to manual operatives. Even where supervision has been provided, the risk has been but partially reduced because rapidly revolving projections are a constant menace wherever found. My safety device avoids such risks in a simple and efficient manner.

With the object in view of providing a safety device that shall meet the practical conditions found in every-day experience I illustrate in the accompanying drawing such an instance of adaptation as shall disclose the fundamental features without limiting myself to the specific details shown.

Figure 1 shows a cross section of a clutch adaptation. Fig. 2 shows a front elevation of Fig. 1 reduced in size. Fig. 3 is an elevation in section of a modified cover fastening.

When my device is applied to clutches, the usual separate shafts A and A' serve to hold thereon radially projecting members which co-act with each other to form clutching elements whereby two shafts are rotated as one or one alone is actuated. To accomplish this the member B is secured to shaft A by means of a key $b$. To this there is bolted the extension B' which is made in separate parts that are clamped together in any suitable manner. On the other shaft A' another radial member C is fastened by means of key $c$. A friction plate E is free to slide in axial alinement to or from C and between these friction blocks D are placed being held in openings of an inwardly projecting flange of the part B'. The parts C and E are also made in separable portions, clamped together by suitable bolts. Projections or bosses $e$ are formed on E in order to support actuating V bolts H which pass through toggles G, being held in place by suitable bearing washers and nuts.

A sleeve F made separable, is slidable endwise of shaft A'. It has an annular projection $f$ over which the split ring I fits, being held from displacement by two inwardly projecting flanges. A flange $i$ projects outwardly to which the sections J of the guard are attached. Studs $i^2$ project radially on each side of the hub portion of this ring. On these plates $l$ are hooked, the plates being fastened to the loop portion L of a shifter lever L' pivoted at $l'$ and operable through a suitable handle. The ring $i$ is held in place by bolts $i^4$ passing through ears $i^3$.

Sleeve F has slotted depressions $f'$ formed opposite each other, into which pins of toggles G project, thus by a to and fro motion of the sleeve the parts E and C are caused to operate on the blocks D which are carried around by B'. When the parts C and E clamp the blocks D shafts A and A' rotate together and when they are free only the driving shaft remains in motion.

The cylindrical cover K may be detachably secured to the radial sections J by fastening one or more brackets $j^4$ on each section near its outer edge so as to prevent the turning of the fastening bolts J' and their loss by being free to drop out of the holes formed in the sections J. Each section has formed thereon an inwardly projecting flange $J^2$ through which the bolts J' pass, beneath these bolts the brackets $j^4$ are placed. They have slots $j^6$ formed therein so as to prevent the bolts J' from turning when the nuts thereof are turned preparatory to removing the cover K so as to make accessible the clutch parts for inspection or adjustment, by simply sliding the cover endwise. In order that the bolts J' will not fall out of the holes in the flanges of the sections J a supplemental projection $j^7$ is formed on the brackets $j^4$.

The guard may also comprise radial sections J which have flanges j formed therein and slots j² cut into their periphery. Flanges j of companion sections are bolted together by bolts j' and the slots receive the wing-nutted bolts j³ that pass therethrough from the flange k' of the cylindrical casing K. The sections may be secured to the flange j of the shift-ring I by means of bolts i⁵. The casing K in this type of construction has a toe k formed at one end thus producing a "broken" joint in contrast to the continuous ring of the previous design. A stiffening edge may be placed at the outer and inner edges of either form of casing if desired.

From the description it will be seen that my device is very simple and eminently practical, permitting economical construction and the greatest possible efficiency in operation.

It is immaterial whether the protective casing J, K is supported by the shifting ring I or is held against rotation by extraneous means, such as supports depending from ceilings etc.

What I claim is,

1. In safety devices, a continuously moving member, an intermittently moving member, means for connecting and disconnecting the members as desired, a non-rotative member adapted to effect such control, and a protective shield carried thereby and extending axially and radially to inclose the movable members.

2. In safety devices, continuous and discontinuously moving members, a non-rotative control, and an inclosing shield carried thereby.

3. In safety devices, a suitable casing, slidable and non-rotative projections inclosed therein and means for supporting said casing by means of said projections.

4. In safety devices a cylindrical casing inclosing rotative elements rotative means for controlling the action of said elements, a slidable non-rotative member adapted to actuate said control, and removable segmental supporting sections interposed between the same and said casing.

5. In safety devices, a cylindrical casing, radial supports therefor, a slidable non-rotative member attached to said radial supports, rotative members within the casing, rotative means for throwing them into or out of action as desired, and suitable connections between the latter and the slidable member.

6. Continuous and discontinuous rotative members, a driving member, rotatable means for connecting the same to the discontinuous member, a non-rotative control for such means, and a protective shield comprising a cylindrical body portion and removable segments carried by such control.

7. Rotative members, a non-rotative slidable control therefor, and a suitable casing supported by the control adapted to inclose the rotating parts.

8. Rotating members, means for actuating the same intermittently, a slidable non-rotative control therefor, a non-rotative shield supported by said control the same projecting beyond the face of the rotating members.

9. Rotative members, axially alined slidable means for controlling the same through an intermediate rotative member, and a suitable protective casing supported on the slidable means adapted to inclose the rotative members.

10. In safety devices, separate rotative members, a rotative controlling device therefor, a non-rotative member for actuating said control and an inclosing shield carried thereby.

11. In safety devices, separate rotative members, a carrier member having friction elements supported thereon, and means adapted to cause said rotative members to engage said elements on opposite faces thereof.

In testimony whereof I affix my signature in presence of two witnesses.

EDWIN HUGH AHARA.

Witnesses:
W. B. HOSFORD,
S. W. SCHUYLER.